United States Patent
Yamada et al.

(10) Patent No.: US 11,965,057 B2
(45) Date of Patent: Apr. 23, 2024

(54) TWO-LIQUID CURABLE COMPOSITION FOR FORMING THERMOPLASTIC MATRIX RESIN, MATRIX RESIN FOR FIBER-REINFORCED COMPOSITE MATERIAL, AND FIBER-REINFORCED COMPOSITE MATERIAL

(71) Applicant: DAI-ICHI KOGYO SEIYAKU CO., LTD., Kyoto (JP)

(72) Inventors: Yoshinori Yamada, Kyoto (JP); Takuma Nishimura, Kyoto (JP); Kei Oikawa, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 695 days.

(21) Appl. No.: 17/055,402

(22) PCT Filed: Apr. 9, 2019

(86) PCT No.: PCT/JP2019/015426
§ 371 (c)(1),
(2) Date: Nov. 13, 2020

(87) PCT Pub. No.: WO2019/220819
PCT Pub. Date: Nov. 21, 2019

(65) Prior Publication Data
US 2021/0221941 A1 Jul. 22, 2021

(30) Foreign Application Priority Data

May 16, 2018 (JP) .................................. 2018-094629
Nov. 30, 2018 (JP) .................................. 2018-225294

(51) Int. Cl.
| | |
|---|---|
| C08J 5/24 | (2006.01) |
| C08G 18/10 | (2006.01) |
| C08G 18/32 | (2006.01) |
| C08G 18/38 | (2006.01) |
| C08G 18/73 | (2006.01) |
| C08G 18/75 | (2006.01) |
| C08J 5/04 | (2006.01) |
| C08K 7/06 | (2006.01) |

(52) U.S. Cl.
CPC ......... C08G 18/3857 (2013.01); C08G 18/10 (2013.01); C08G 18/324 (2013.01); C08G 18/73 (2013.01); C08G 18/755 (2013.01); C08G 18/758 (2013.01); C08J 5/042 (2013.01); C08J 5/243 (2021.05); C08J 2375/04 (2013.01)

(58) Field of Classification Search
None
See application file for complete search history.

(56) References Cited

U.S. PATENT DOCUMENTS

| | | | |
|---|---|---|---|
| 4,595,742 A | 6/1986 | Nalepa et al. | |
| 2011/0014479 A1* | 1/2011 | Song ................. | C08G 18/4216 156/305 |
| 2013/0203935 A1 | 8/2013 | Thiele et al. | |
| 2015/0232608 A1* | 8/2015 | Durnay ................ | C09D 175/12 528/68 |

FOREIGN PATENT DOCUMENTS

| | | | |
|---|---|---|---|
| CN | 101928376 | * | 12/2010 |
| CN | 103102469 | * | 5/2013 |
| JP | 61-258825 A | | 11/1986 |
| JP | 08085717 | * | 4/1996 |
| JP | 09052290 | * | 2/1997 |
| JP | 2002-80555 A | | 3/2002 |
| JP | 2014-506606 A | | 3/2014 |

OTHER PUBLICATIONS

International Search Report dated Jun. 4, 2019 in PCT/JP2019/015426, citing documents AA, AO and AP therein, 2 pages.
International Preliminary Report on Patentability dated Nov. 17, 2020 in PCT/JP2019/015426 filed Apr. 9, 2019, citing documents AA, AO and AP therein, 6 pages.

* cited by examiner

Primary Examiner — David J Buttner
(74) Attorney, Agent, or Firm — Oblon, McClelland, Maier & Neustadt, L.L.P.

(57) ABSTRACT

As a thermoplastic resin used as a matrix resin for a fiber-reinforced composite material, a thermoplastic resin having a high glass transition temperature in spite of having a low resin viscosity during molding is provided. Provided are a two-liquid curable composition for forming a thermoplastic matrix resin, the two-liquid curable composition containing an active hydrogen component containing an alkylthio group-containing aromatic diamine (A) and a diisocyanate component containing at least one kind of diisocyanate (B) selected from the group consisting of aliphatic diisocyanates, alicyclic diisocyanates, and modified forms of aliphatic diisocyanates and alicyclic diisocyanates, a matrix resin for a fiber-reinforced composite material, the matrix resin being a thermoplastic resin containing a reaction product of the active hydrogen component and the diisocyanate component, and a fiber-reinforced composite material containing the matrix resin and reinforcing fiber.

5 Claims, No Drawings

TWO-LIQUID CURABLE COMPOSITION FOR FORMING THERMOPLASTIC MATRIX RESIN, MATRIX RESIN FOR FIBER-REINFORCED COMPOSITE MATERIAL, AND FIBER-REINFORCED COMPOSITE MATERIAL

CROSS-REFERENCE TO RELATED APPLICATIONS

This application is a national stage application of International Application No. PCT/JP2019/015426, filed Apr. 9, 2019, which is based upon and claims the benefit of priority to Japanese Patent Applications No. 2018-094629, filed May 16, 2018 and No. 2018-225294, filed Nov. 30, 2018. The entire contents of these applications are incorporated herein by reference.

TECHNICAL FIELD

The present invention relates to a two-liquid curable composition for forming a thermoplastic matrix resin, the two-liquid curable composition being used to form a matrix resin for a fiber-reinforced composite material, a matrix resin for a fiber-reinforced composite material, and a fiber-reinforced composite material with the use of these.

BACKGROUND ART

Because of exhibiting lightness and excellent performance, fiber-reinforced composite materials (FRP) are used in wide-ranging applications such as in electrical and electronic parts, vehicles, and aviation. For fiber-reinforced composite materials, thermosetting resins such as epoxy resins are often used as matrix resins. However, such thermosetting resins often have a high resin viscosity during molding, exhibiting a poor fluidity, and are thus left with room for improvement particularly in workability during the manufacture of large products.

Furthermore, no heat processing can be performed on thermosetting resins after curing. Thus, to enable heat processing after combination with reinforcing fiber and curing, thermoplastic resins are advantageous in use as matrix resins for fiber-reinforced composite materials.

PTL 1 discloses a technique in which a polyurethane resin is used as a matrix resin to achieve a low resin viscosity during molding and thereby enhance workability. However, the polyurethane resin disclosed in PTL 1 has a glass transition temperature as low as about 50° C. to 130° C. and thus is limited in usable applications.

CITATION LIST

Patent Literature

PTL 1: Japanese Unexamined Patent Application Publication (Translation of PCT Application) No. 2014-506606

SUMMARY OF INVENTION

Technical Problem

In light of the above, embodiments of the present invention have an object to provide a matrix resin for a fiber-reinforced composite material, the matrix resin having a high glass transition temperature in spite of having a low resin viscosity during molding, as a thermoplastic resin used as a matrix resin for a fiber-reinforced composite material, a two-liquid curable composition for forming a thermoplastic matrix resin to form the foregoing, and a fiber-reinforced composite material with the use of these.

Solution to Problem

A two-liquid curable composition for forming a thermoplastic matrix resin according to an embodiment of the present invention, the two-liquid curable composition being used to form a matrix resin for a fiber-reinforced composite material, contains an active hydrogen component containing an alkylthio group-containing aromatic diamine (A) and a diisocyanate component containing at least one kind of diisocyanate (B) selected from the group consisting of aliphatic diisocyanates, alicyclic diisocyanates, and modified forms of aliphatic diisocyanates and alicyclic diisocyanates.

A matrix resin for a fiber-reinforced composite material according to an embodiment of the present invention is a thermoplastic resin containing a reaction product of an active hydrogen component containing an alkylthio group-containing aromatic diamine (A) and a diisocyanate component containing at least one kind of diisocyanate (B) selected from the group consisting of aliphatic diisocyanates, alicyclic diisocyanates, and modified forms of aliphatic diisocyanates and alicyclic diisocyanates.

A fiber-reinforced composite material according to an embodiment of the present invention contains a cured product of the two-liquid curable composition or the matrix resin and reinforcing fiber.

Advantageous Effects of Invention

According to an embodiment of the present invention, a thermoplastic resin capable of exhibiting a balance between a low resin viscosity during molding and a high glass transition temperature can be provided as a matrix resin for a fiber-reinforced composite material.

DESCRIPTION OF EMBODIMENTS

Hereafter, embodiments of the present invention will be specifically described.

The present inventors have found that when a thermoplastic resin is produced with the use of an alkylthio group-containing aromatic diamine, such as dimethylthiotoluenediamine, and a certain kind of diisocyanate, the resin viscosity during molding can be kept low and the thermoplastic resin has a high glass transition temperature. Studies of usefully utilizable applications of such excellent characteristics have led the present inventors to the invention in which such a thermoplastic resin is used as a matrix resin for a fiber-reinforced composite material.

A two-liquid curable composition for forming a thermoplastic matrix resin according to the present embodiment (which hereafter is also simply referred to as a "two-liquid curable composition") contains an active hydrogen component containing an alkylthio group-containing aromatic diamine (A) and a diisocyanate component containing at least one kind of diisocyanate (B) selected from the group consisting of aliphatic diisocyanates, alicyclic diisocyanates, and modified forms of aliphatic diisocyanates and alicyclic diisocyanates. A matrix resin for a fiber-reinforced composite material according to the present embodiment (which hereafter is also simply referred to as a "matrix resin") is a thermoplastic resin containing a reaction product of an active hydrogen component containing an alkylthio group-containing aromatic diamine (A) and a diisocyanate component containing at least one kind of diisocyanate (B) selected from the group consisting of aliphatic diisocyanates, alicyclic diisocyanates, and modified forms of aliphatic diisocyanates and alicyclic diisocyanates.

[Active Hydrogen Component]

In the present embodiment, an active hydrogen component contains an alkylthio group-containing aromatic diamine (A). The alkylthio group-containing aromatic diamine (A) is preferably a compound containing an alkylthio group directly bonded to an aromatic ring along with two amino groups directly bonded to the aromatic ring. The alkylthio group is a group represented by $-SC_nH_{2n+1}$ (wherein n is an integer of 1 or more, preferably an integer of 1 to 5). The aromatic diamine (A) may contain one alkylthio group or two or more alkylthio groups in one molecule and preferably contains two alkylthio groups directly bonded to an aromatic ring.

As the aromatic diamine (A), for example, a dialkylthiotoluenediamine such as dimethylthiotoluenediamine, diethylthiotoluenediamine, or dipropylthiotoluenediamine is preferably used.

As the active hydrogen component, diamines such as other aromatic diamines may be used in combination with the aromatic diamine (A). Examples of such other diamines include 4,4'-methylenedianiline, 4,4'-methylenebis(2-methylaniline), 4,4'-methylenebis(2-ethylaniline), 4,4'-methylenebis(2-isopropylaniline), 4,4'-methylenebis(2,6-dimethylaniline), 4,4'-methylenebis(2,6-diethylaniline), 4,4'-methylenebis(N-methylaniline), 4,4'-methylenebis(N-ethylaniline), 4,4'-methylenebis(N-sec-butylaniline), and diethyltoluenediamine. These may be used in any one kind or in a combination of two or more kinds.

The aromatic diamine (A) preferably serves as the main component of the diamine used as the active hydrogen component. The aromatic diamine (A) preferably accounts for 50% by mass or more of the diamine, the aromatic diamine (A) more preferably accounts for 70% by mass or more of the diamine, the aromatic diamine (A) even more preferably accounts for 80% by mass or more of the diamine, and the aromatic diamine (A) may account for 100% by mass of the diamine.

The aromatic diamine (A) preferably accounts for 15% by mass or more of the active hydrogen component, the aromatic diamine (A) more preferably accounts for 40% by mass or more of the active hydrogen component, and the aromatic diamine (A) even more preferably accounts for 70% by mass or more of the active hydrogen component.

As the active hydrogen component, a diol (C) may be contained along with the diamine. When a diol (C) is contained, the tensile fracture strain can be increased to thereby enable the enhancement of the impact resistance of a fiber-reinforced composite material. Examples of the diol (C) include: alkylene glycols such as ethylene glycol, propylene glycol, 1,4-butanediol, 1,5-pentanediol, 3-methyl-1,5-pentanediol, and 1,6-hexanediol; polyalkylene glycols such as diethylene glycol, triethylene glycol, tetraethylene glycol, dipropylene glycol, tripropylene glycol, and polypropylene glycol; and cyclohexanedimethanol, bisphenol A, hydrogenated bisphenol A, bisphenol S, and bisphenol F. These may be used in any one kind or in a combination of two or more kinds.

When a diol (C) is contained as the active hydrogen component, a mass ratio (A/C) of the aromatic diamine (A) to the diol (C) is preferably 0.1 to 30. In this case, the tensile fracture strain can be enhanced while retaining a high glass transition temperature. That is, when the mass ratio (A/C) is 0.1 or more, a high glass transition temperature can be retained, and when the mass ratio (A/C) is 30 or less, the tensile fracture strain can be increased. The mass ratio (A/C) is more preferably 0.5 or more, even more preferably 1.0 or more. The mass ratio (A/C) is preferably 20 or less, more preferably 10 or less.

The proportion of the total amount of the aromatic diamine (A) and the diol (C) in the active hydrogen component is not particularly limited, but with respect to 100% by mass of the active hydrogen component, the total amount of the (A) and the (C) is preferably 50% by mass or more, more preferably 70% by mass or more, and even more preferably 90% by mass or more and may be 100% by mass.

In the present embodiment, to form a thermoplastic resin, the active hydrogen component is bifunctional, that is, a diamine and a diol are used. However, within the range where a thermoplastic resin is obtained, a trifunctional or higher-functional polyamine and a trifunctional or higher-functional polyol may be contained.

[Diisocyanate Component]

In the present embodiment, the diisocyanate component contains at least one kind of diisocyanate (B) selected from the group consisting of aliphatic diisocyanates, alicyclic diisocyanates, and modified forms of aliphatic diisocyanates and alicyclic diisocyanates. With the use of the diisocyanate (B), due to combination with the aromatic diamine (A), a balance between a low resin viscosity during molding and a high glass transition temperature can be exhibited. Particularly with the use of an aliphatic diisocyanate or a modified form thereof, the tensile fracture strain of the resin to be obtained can be further increased. With the use of an alicyclic diisocyanate or a modified form thereof, the glass transition temperature of the resin to be obtained can be higher.

Examples of the aliphatic diisocyanate (i.e., open-chain aliphatic diisocyanate) include tetramethylene diisocyanate, dodecamethylene diisocyanate, hexamethylene diisocyanate (HDI), 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of modified forms of the aliphatic diisocyanate include isocyanate group-terminated urethane prepolymer forms, bifunctional adduct-modified forms, and bifunctional allophanate-modified forms obtained by reacting an aliphatic diisocyanate with a diol. Among these, as the aliphatic diisocyanate, at least one kind selected from the group consisting of hexamethylene diisocyanate (HDI) and modified forms thereof is preferably used in view of a lower viscosity during molding and a further excellent tensile fracture strain of the resin to be obtained.

Examples of the alicyclic diisocyanate include isophorone diisocyanate (IPDI), hydrogenated xylylene diisocyanate, 4,4'-dicyclohexylmethane diisocyanate (H12MDI), 1,4-cyclohexane diisocyanate, methylcyclohexylene diisocyanate, and 1,3-bis(isocyanatomethyl)cyclohexane. Examples of modified forms of the alicyclic diisocyanate include isocyanate group-terminated urethane prepolymer forms, bifunctional adduct-modified forms, and bifunctional allophanate-modified forms obtained by reacting an alicyclic diisocyanate with a diol. Among these, as the alicyclic diisocyanate, at least one kind selected from the group consisting of isophorone diisocyanate (IPDI) and 4,4'-dicyclohexylmethane diisocyanate (H12MDI) is preferably used.

The isocyanate group content of the diisocyanate (B) is preferably 15% to 50% by mass. When the diisocyanate having such a large isocyanate group content and thus having a small molecular weight is used, the glass transition temperature of the thermoplastic resin to be obtained can be higher. The isocyanate group content is preferably 15% by mass or more, more preferably 17% by mass or more. Here, the term "isocyanate group content" refers to a mass proportion of reactive isocyanate groups (NCO) of a bifunctional diisocyanate (B) in the diisocyanate (B). The isocyanate group content can be measured in accordance with JIS K7301-6-3.

In the present embodiment, preferably, the diisocyanate component consists substantially only of the diisocyanate (B). The diisocyanate (B) preferably accounts for 80% by mass or more, more preferably accounts for 90% by mass or more, even more preferably accounts for 95% by mass or more, and particularly preferably 98% by mass or more of the diisocyanate component.

In the present embodiment, to form a thermoplastic resin, a bifunctional isocyanate, that is, a diisocyanate is used as an isocyanate to be reacted with the active hydrogen component. However, within the range where a thermoplastic resin is obtained, a trifunctional or higher-functional polyisocyanate may be contained.

[Two-Liquid Curable Composition]

A two-liquid curable composition according to the present embodiment contains the active hydrogen component and the diisocyanate component, and with the reaction between the active hydrogen component and the diisocyanate component, a thermoplastic resin is produced. That is, the two-liquid curable composition has a property whereby a reaction product becomes a thermoplastic resin. The two-liquid curable composition is a two-liquid curable resin composition in which the active hydrogen component serves as a first liquid and the diisocyanate component serves as a second liquid, and when the first liquid and the second liquid are mixed, these components can be reacted and cured.

In the two-liquid curable composition, a catalyst to promote a reaction between the active hydrogen component and the diisocyanate component may be contained. As the catalyst, usually, a metal catalyst or an amine catalyst used for manufacturing a polyurethane resin can be used. Examples of the metal catalyst include tin catalysts such as dibutyltin dilaurate, dioctyltin dilaurate, and dibutyltin dioctoate, lead catalysts such as lead octylate, lead octenoate, and lead naphthenate, and bismuth catalysts such as bismuth octylate and bismuth neodecanoate. Examples of the amine catalyst include tertiary amine compounds such as triethylenediamine. These catalysts can be used alone or in combination.

Other than the foregoing, as needed, the two-liquid curable composition may contain various additives such as plasticizers, flame retardants, antioxidants, moisture absorbers, antifungal agents, silane coupling agents, defoamers, surface conditioners, and internal demolding agents.

In the two-liquid curable composition, the molar ratio of isocyanate groups to active hydrogen groups (i.e., the total of amino groups and hydroxy groups) (NCO/active hydrogen groups) is not particularly limited and may be 1.0 or more, 1.2 or more, or 1.5 or more. The molar ratio (NCO/active hydrogen groups) may be 2.0 or less, 1.5 or less, or 1.2 or less. With such a small amount of active hydrogen groups, tack (stickiness) can be prevented or reduced.

The viscosity of the two-liquid curable composition in an environment of 25° C. and 3 minutes after mixing is not particularly limited. For example, the viscosity is preferably 1500 mPa·s or less, more preferably 1000 mPa·s or less, even more preferably 800 mPa·s or less, still even more preferably 600 mPa·s or less, and yet still even more preferably 300 mPa·s or less.

The viscosity of the two-liquid curable composition in an environment of 25° C. and 5 minutes after mixing is not particularly limited. For example, the viscosity is preferably 30000 mPa·s or less, more preferably 3000 mPa·s or less, even more preferably 1000 mPa·s or less, still even more preferably 800 mPa·s or less, yet still even more preferably 600 mPa·s or less, and further yet still even more preferably 300 mPa·s or less.

The two-liquid curable composition according to the present embodiment includes two liquids, that is, a first liquid and a second liquid, but may include three liquids or more as long as the composition includes at least two liquids. For example, the composition may include a first liquid containing the aromatic diamine (A), a second liquid containing the diisocyanate (B), and a third liquid containing the diol (C). The composition may include a first liquid containing the aromatic diamine (A) and the diol (C) and a second liquid containing the diisocyanate (B).

[Matrix Resin for Fiber-Reinforced Composite Material]

A matrix resin according to the present embodiment is a thermoplastic resin containing a reaction product of the active hydrogen component and the diisocyanate component and is obtained by curing the two-liquid curable composition in an embodiment. When no diol (C) is contained in the active hydrogen component, the resin to be obtained is a thermoplastic polyurea resin, and when the diol (C) is contained in the active hydrogen component, the resin to be obtained is a thermoplastic polyurethane-urea resin. Here, the term "thermoplastic polyurethane-urea resin" refers to a resin containing both urethane and urea bonds in the main chain.

The glass transition temperature (Tg) of the matrix resin according to the present embodiment is not particularly limited. The glass transition temperature is, for example, preferably 80° C. or more, more preferably 100° C. or more, even more preferably 120° C. or more, and particularly more preferably 150° C. or more. The upper limit of the glass transition temperature is not particularly limited and may be, for example, 200° C. or less.

[Fiber-Reinforced Composite Material]

A fiber-reinforced composite material (FRP) according to the present embodiment contains a cured product of the two-liquid curable composition or the matrix resin and reinforcing fiber.

The reinforcing fiber is not particularly limited, and examples thereof include carbon fibers, glass fibers, aramid fibers, alumina fibers, silicon carbide fibers, boron fibers, metal fibers, natural fibers, and mineral fibers. The reinforcing fiber may be formed of any one kind or a combination of two or more kinds of these. Among these, the reinforcing fiber is preferably carbon fiber such as that of PAN, pitch, or rayon in view of its high strength, high hardness, and lightness. The reinforcing fiber is preferably glass fiber in view of enhancing economy and more preferably contains carbon fiber and glass fiber. The reinforcing fiber preferably contains aramid fiber in view of enhancing, for example, the impact absorption properties of the molded article to be obtained and more preferably contains carbon fiber and aramid fiber. The reinforcing fiber may be reinforcing fiber coated with a metal such as nickel in view of enhancing the conductivity of the molded article to be obtained.

The form of the reinforcing fiber is not particularly limited either. The fiber-reinforced composite material may be, for example, shredded fiber uniformly dispersed in the matrix resin, or a fiber sheet that is formed of directed fibers, such as a woven fabric, a knitted fabric, or a non-woven fabric, impregnated with the matrix resin.

The proportion of the matrix resin to the reinforcing fiber in the fiber-reinforced composite material is not particularly limited. For example, the volume of the reinforcing fiber with respect to the unit volume of the fiber-reinforced composite material is preferably 30% to 70%, more preferably 50% to 60%, in view of mechanical physical properties such as strength. The volume of the matrix resin with respect to the unit volume of the fiber-reinforced composite material is preferably 30% to 70%, more preferably 40% to 50%.

The method for manufacturing the fiber-reinforced composite material according to the present embodiment is not particularly limited. For example, the composite material can be produced through a method in which the two-liquid curable composition is mixed and applied to the reinforcing fiber to make the reinforcing fiber impregnated with the two-liquid curable composition, and the two-liquid curable composition is thereafter cured. A step of application of and impregnation with the two-liquid curable composition may be performed using a publicly known method (e.g., a brush or a roller). A step of curing the two-liquid curable composition may be performed, as needed, in a heated environment (e.g., of 60° C. to 200° C.), in a reduced-pressure environment (e.g., of 5 kPa or less), or under pressure environment. Here, due to the use of the two-liquid curable composition in the fiber-reinforced composite material according to the present embodiment, workability during molding is improved.

More specifically, as the method for molding the fiber-reinforced composite material, for example, a publicly known molding method such as a prepreg method, a hand lay-up method, or a VaRTM (Vacuum Assisted Resin Transfer Molding) method can be used. In a prepreg method, fiber that has been formed into, for example, a unidirectional, woven fabric, yarn, or mat form is impregnated with the two-liquid curable composition that has been mixed to thereby obtain a prepreg. After a shaping step such as layering or winding is performed on the prepreg, the prepreg is heat molded through a method such as a press or an autoclave to thereby obtain a fiber-reinforced composite material. In a hand lay-up method, fiber is spread out on a mold, and, while being impregnated with the two-liquid curable composition that has been mixed, the fiber is layered. The two-liquid curable composition is thereafter cured to thereby obtain a fiber-reinforced composite material. In a VaRTM method, at a vacuum pressure, a stack of plural sheets of reinforcing fiber that has been vacuum-packed with, for example, a film is, injected and impregnated with the two-liquid curable composition that has been mixed and the two-liquid curable composition is thereafter cured to thereby obtain a fiber-reinforced composite material.

The fiber-reinforced composite material according to the present embodiment is suitable for electronic device housings and is suitably used in, for example, computers, television sets, cameras, and audio players. Furthermore, the fiber-reinforced composite material is suitable for applications in electrical and electronic parts and is suitably used in, for example, connectors, LED lamps, sockets, optical pickups, terminal boards, printed circuit boards, speakers, small motors, magnetic heads, power modules, generators, electric motors, voltage transformers, current transformers, voltage regulators, rectifiers, and inverters. Additionally, the composite material is suitable for, for example, automobile parts and vehicle-related parts and is suitably used in, for example, safety belt parts, instrument panels, console boxes, pillars, roof rails, fenders, bumpers, door panels, roof panels, hood panels, trunk lids, door mirror stays, spoilers, hood louvers, wheel covers, wheel caps, garnishes, intake manifolds, fuel pumps, engine-cooling water joints, window-washer nozzles, wipers, battery peripherals, wire harness connectors, lamp housings, lamp reflectors, and lamp sockets. Moreover, the fiber-reinforced composite material is suitable as a building material and is suitably used in, for example, wall, roof, and ceiling material-related parts, window material-related parts, insulating material-related parts, flooring material-related parts, seismic isolation and vibration control member-related parts, and lifeline-related parts of civil engineering buildings. In addition, the fiber-reinforced composite material is suitable for sporting goods and is suitably used in, for example, golf-related goods such as golf club shafts and golf balls, sporting racket-related goods such as tennis rackets and badminton rackets, sporting body protective gears such as masks, helmets, chest pads, elbow pads, and knee pads for, for example, American football, baseball, and softball, fishing tackle-related goods such as fishing rods, reels, and lures, and goods related to winter sporting such as skiing and snowboarding.

[Working Effects]

In the present embodiment, it is possible to provide a thermoplastic resin having a high glass transition temperature in spite of having a low resin viscosity during molding. Due to the low resin viscosity during molding, the fluidity of the matrix resin during combination with the reinforcing fiber can be enhanced to thereby enable the enhancement of molding workability.

With the use of a resin having such a high glass transition temperature and thermoplastic properties as the matrix resin for the fiber-reinforced composite material, heat processing is enabled after curing. Thus, for example, a flat plate-formed fiber-reinforced composite material that has been produced can be used to be subjected to heat processing to thereby be shaped into a curved form. This indicates excellent processability. Furthermore, in addition to such heat processability, a high glass transition temperature is exhibited, and thus the heat resistance in an actual usage environment can be enhanced. Accordingly, a fiber-reinforced composite material having a high heat resistance can be provided. Thus, the application can be expanded to members close to a heat source.

With an existing polyurethane resin composition, when an attempt is made to realize a high glass transition temperature, the tensile fracture strain (i.e., elongation until fracture) tends to deteriorate. However, in the present embodiment, for example, when the diol (C) is used in combination as the active hydrogen component, a balance between a high glass transition temperature and a high tensile fracture strain can be exhibited. Thus, the fiber-reinforced composite material can exhibit an enhanced impact resistance in spite of having an excellent heat resistance.

EXAMPLES

Hereafter, the present invention will be described further specifically with reference to Examples, but the present invention is not intended to be limited to the Examples below unless they depart from the spirit of the present invention.

In accordance with the combination (parts) presented in Tables 1 to 3 below, two-liquid curable compositions of Examples 1 to 20 and Comparative Examples 1 to 5 were prepared. Specifically, components other than a diisocyanate component were mixed to prepare a first liquid, the obtained first liquid was adjusted to 25° C., the diisocyanate component (a second liquid) adjusted to 25° C. was added thereto, and stirring and mixing were performed for 1 minute.

The specifics of the components presented in Tables 1 to 3 are as follows.

(Diamine)
Dimethylthiotoluenediamine: "ETHACURE 300" manufactured by Lonza Ltd.
Diethyltoluenediamine (DETDA): "ETHACURE 100" manufactured by Lonza Ltd.
4,4'-methylenebis(N-sec-butylaniline): "ETHACURE 420" manufactured by Lonza Ltd.

(Diol)
PPG: Polypropylene glycol (Mw400), "HIFLEX D400" manufactured by Dai-ichi Kogyo Seiyaku Co., Ltd.
DPG: Dipropylene glycol
TPG: Tripropylene glycol
3MPD: 3-methyl-1,5-pentanediol (Diisocyanate Component)
Modified HDI (1): A bifunctional urethane prepolymer form of HDI, NCO content=23% by mass, "DURANATE D101" manufactured by Asahi Kasei Corporation
Modified HDI (2): A bifunctional adduct-modified form of HDI, NCO content=17% by mass, "DURANATE A201" manufactured by Asahi Kasei Corporation
HDI: Hexamethylene diisocyanate, NCO content=50% by mass, "DURANATE 50M-HDI" manufactured by Asahi Kasei Corporation
IPDI: Isophorone diisocyanate, NCO content=38% by mass, "VESTANAT IPDI" manufactured by EVONIK Industries AG
H12MDI: 4,4'-dicyclohexylmethane diisocyanate, NCO content=32% by mass, "Desmodur W" manufactured by Covestro AG
MDI: 4,4'-diphenylmethane diisocyanate, NCO content=34% by mass, "MILLIONATE MT" manufactured by Tosoh Corporation (Others)
Metal catalyst: Dioctyltin dilaurate, "NEOSTANN U810" manufactured by Nitto Kasei Co., Ltd.
Synthetic zeolite: "Molecular Sieve 3AB" manufactured by Union Showa K.K.

The mixed viscosity, glass transition temperature (Tg), tensile fracture strain, and curability of the two-liquid curable compositions of Examples 1 to 20 and Comparative Examples 1 to 5 were evaluated through the evaluation method below. The results are presented in Tables 1 to 3.

(1) Mixed Viscosity (mPa·s)

Each of the above-described mixtures was left to stand in an environment of 25° C. and the viscosity 3 minutes after the start of mixing was measured. Each of the above-described mixtures was thereafter left to stand again in an environment of 25° C. and the viscosity 5 minutes after the start of mixing was measured. The viscosity was measured using a BM viscometer (manufactured by Toki Sangyo Co., Ltd.) in accordance with JIS K7117-1.

(2) Glass Transition Temperature (° C.)

Each of the above-described mixtures was applied in a sheet form and was processed at 80° C. for 1 hour and thereafter at 150° C. for 16 hours to thereby obtain a sheet of polyurea resin or polyurethane-urea resin having a thickness of 2 mm. A test piece of 5 mm×2 cm was cut out from the obtained resin sheet and the glass transition temperature (Tg) was measured using a Rheogel E-4000 manufactured by UBM Co., Ltd. under the conditions of a distance between chucks of 20 mm, a fundamental frequency of 10 Hz, and a strain being set up with an automatic control mode.

(3) Tensile Fracture Strain (%)

A resin sheet having a film thickness of 1 mm was obtained through the same method as in the case of the glass transition temperature. A test piece of 5 mm×4 cm was cut out from the obtained resin sheet and the elongation at tensile fracture (%) was measured using a digital universal tester (Instron 5581) manufactured by Instron Japan Co., Ltd. in accordance with JIS K7161-1.

(4) Curability

Each of the above-described mixtures was cured through manual stirring using a spatula for 1 minute. The presence or absence of separation was confirmed through visual observation. Those with the absence of separation were thereafter fingered, and those confirmed to have a certain degree of hardness were indicated as "cured". Those confirmed to be separated through visual observation were indicated as "separated".

TABLE 1

| | Examples | | | | | | | | | |
|---|---|---|---|---|---|---|---|---|---|---|
| Combination (Parts) | 1 | 2 | 3 | 4 | 5 | 6 | 7 | 8 | 9 | 10 |
| Dimethylthiotoluenediamine | 75 | 75 | 75 | 75 | 75 | 75 | 75 | 95 | 50 | 75 |
| Diethyltoluenediamine | — | — | — | — | — | — | — | — | — | — |
| 4,4'-methylenebis(N-sec-butylaniline) | — | — | — | — | — | — | — | — | 50 | 25 |
| PPG | 25 | 25 | 25 | 25 | 25 | — | — | — | — | — |
| DPG | — | — | — | — | — | 25 | — | — | — | — |
| TPG | — | — | — | — | — | — | 25 | — | — | — |
| 3MPD | — | — | — | — | — | — | — | 5 | — | — |
| Modified HDI (1) | 183.5 | — | — | — | — | 236.3 | 212.3 | 216.7 | 176.6 | 192.9 |
| Modified HDI (2) | — | 210.2 | — | — | — | — | — | — | — | — |
| HDI | — | — | 72.3 | — | — | — | — | — | — | — |
| IPDI | — | — | — | 95.6 | — | — | — | — | — | — |

TABLE 1-continued

|  | Examples | | | | | | | | | |
|---|---|---|---|---|---|---|---|---|---|---|
|  | 1 | 2 | 3 | 4 | 5 | 6 | 7 | 8 | 9 | 10 |
| H12 MDI | — | — | — | — | 113.1 | — | — | — | — | — |
| MDI | — | — | — | — | — | — | — | — | — | — |
| Metal catalyst | 0.001 | 0.001 | 0.001 | 0.001 | 0.001 | 0.001 | 0.001 | 0.001 | — | — |
| Synthetic zeolite | — | — | — | — | — | — | — | — | — | — |
| Total | 283.5 | 310.2 | 172.3 | 195.6 | 213.1 | 336.3 | 312.3 | 316.7 | 276.6 | 292.9 |
| (A)/(C) | 3.0 | 3.0 | 3.0 | 3.0 | 3.0 | 3.0 | 3.0 | 19 | — | — |
| Molar ratio of NCO/active hydrogen groups | 1.0 | 1.0 | 1.0 | 1.0 | 1.0 | 1.0 | 1.0 | 1.0 | 1.0 | 1.1 |
| Evaluation results | | | | | | | | | | |
| Mixed viscosity (mPa·s/after 3 mins) | 310 | 110 | 215 | 800 | 180 | 310 | 245 | 380 | 260 | 275 |
| Mixed viscosity (mPa·s/after 5 mins) | 320 | 110 | 220 | 850 | 180 | 380 | 250 | 420 | 260 | 280 |
| Tg (°C.) | 166 | 155 | 165 | 170 | 178 | 161 | 161 | 161 | 165 | 164 |
| Tensile fracture strain (%) | 180 | 235 | 280 | 155 | 145 | 300 | 340 | 220 | 75 | 55 |
| Curability | Cured | Cured | Cured | Cured | Cured | Cured | Cured | Cured | Cured | Cured |

TABLE 2

|  | Examples | | | | | | | | | |
|---|---|---|---|---|---|---|---|---|---|---|
|  | 11 | 12 | 13 | 14 | 15 | 16 | 17 | 18 | 19 | 20 |
| Combination (Parts) | | | | | | | | | | |
| Dimethylthiotoluenediamine | 20 | 100 | 100 | 100 | 75 | 95 | 90 | 85 | 90 | 75 |
| Diethyltoluenediamine | — | — | — | — | — | 5 | 10 | 15 | 5 | 15 |
| 4,4'-methylenebis(N-sec-butylaniline) | — | — | — | — | — | — | — | — | 5 | 10 |
| PPG | 80 | — | — | — | 25 | — | — | — | — | — |
| DPG | — | — | — | — | — | — | — | — | — | — |
| TPG | — | — | — | — | — | — | — | — | — | — |
| 3MPD | — | — | — | — | — | — | — | — | — | — |
| Modified HDI (1) | 127.3 | 209.1 | — | — | 183.5 | — | 159 | — | — | 30 |
| Modified HDI (2) | — | — | 239.5 | — | — | 156 | — | 100 | — | 40 |
| HDI | — | — | — | 82.4 | — | — | — | — | 80 | — |
| IPDI | — | — | — | — | — | 39 | — | — | — | 30 |
| H12 MDI | — | — | — | — | — | — | 40 | — | 20 | — |
| MDI | — | — | — | — | — | — | — | — | — | — |
| Metal catalyst | 0.003 | — | — | — | 0.001 | — | — | — | — | — |
| Synthetic zeolite | — | — | — | — | 3 | — | — | — | — | — |
| Total | 227.3 | 309.1 | 339.5 | 182.4 | 286.5 | 295.0 | 299.0 | 200.0 | 200.0 | 200.0 |
| (A)/(C) | 0.25 | — | — | — | 3.0 | — | — | — | — | — |
| Molar ratio of NCO/active hydrogen groups | 1.1 | 1.0 | 1.1 | 1.1 | 1.1 | 1.1 | 1.1 | 1.1 | 1.1 | 1.1 |
| Evaluation results | | | | | | | | | | |
| Mixed viscosity (mPa·s/after 3 mins) | 240 | 450 | 205 | 170 | 400 | 205 | 220 | 1200 | 210 | 980 |
| Mixed viscosity (mPa·s/after 5 mins) | 240 | 500 | 205 | 170 | 400 | 450 | 2200 | 21000 | 230 | 14000 |
| Tg (°C.) | 143 | 160 | 161 | 184 | 156 | 170 | 178 | 165 | 161 | 168 |
| Tensile fracture strain (%) | 220 | 70 | 91 | 80 | 90 | 25 | 42 | 85 | 67 | 123 |
| Curability | Cured | Cured | Cured | Cured | Cured | Cured | Cured | Cured | Cured | Cured |

TABLE 3

|  | Comparative Examples | | | | |
|---|---|---|---|---|---|
| Combination (Parts) | 1 | 2 | 3 | 4 | 5 |
| Dimethylthiotoluenediamine | — | — | — | — | 100 |
| Diethyltoluenediamine | 70 | — | 100 | — | — |
| 4,4'-methylenebis(N-sec-butylaniline) | — | 70 | — | — | — |
| PPG | 30 | 30 | — | 100 | — |
| DPG | — | — | — | — | — |
| TPG | — | — | — | — | — |
| 3MPD | — | — | — | — | — |
| Modified HDI (1) | 208.0 | 132.9 | 251.4 | 106.8 | — |
| Modified HDI (2) | — | — | — | — | — |

TABLE 3-continued

| | Comparative Examples | | | | |
|---|---|---|---|---|---|
| Combination (Parts) | 1 | 2 | 3 | 4 | 5 |
| HDI | — | — | — | — | — |
| IPDI | — | — | — | — | — |
| H12 MDI | — | — | — | — | — |
| MDI | — | — | — | — | 122.6 |
| Metal catalyst | — | 0.005 | — | — | — |
| Synthetic zeolite | — | — | — | — | — |
| Total | 308.0 | 232.9 | 351.4 | 206.8 | 222.6 |
| (A)/(C) | 2.3 | 2.3 | — | — | — |
| Molar ratio of NCO/ active hydrogen groups | 1.0 | 1.0 | 1.1 | 1.0 | 1.1 |
| Evaluation results | | | | | |
| Mixed viscosity (mPa · s/after 3 mins) | Gelled | 280 | Gelled | 65 | Gelled |
| Mixed viscosity (mPa · s/after 5 mins) | Gelled | 300 | Gelled | 65 | Gelled |
| Tg (° C.) | — | — | — | 89 | — |
| Tensile fracture strain (%) | — | — | — | 4 | — |
| Curability | Separated | Cured | Separated | Cured | Separated |

As presented in Tables 1 to 3, with the two-liquid curable compositions of Examples 1 to 20, thermoplastic resins having a low mixed viscosity and a high glass transition temperature were obtained. In Examples 18 and 20, the viscosity 5 minutes after mixing was relatively high but the viscosity 3 minutes after mixing was low, and thus, depending on the molding method, the resin viscosity during molding was enabled to be kept low. In Examples 1 to 20 and Comparative Example 4, the melting of the cured resin in an environment of 220° C. was confirmed. Thus, it is evident that the two-liquid curable compositions of Examples 1 to 20 are excellent in applications as matrix resins for fiber-reinforced composite materials.

In Examples 1 to 8 and 11 in which a diol was used in combination as the active hydrogen component, the tensile fracture strain was revealed to be large. The comparison between Examples 1 to 3 and Examples 4 and 5 revealed higher effectiveness in the enhancement of the tensile fracture strain in Examples 1 to 3 in which an aliphatic diisocyanate or a modified form thereof was used as the diisocyanate and on the other hand revealed higher effectiveness in the enhancement of the glass transition temperature in Examples 4 and 5 in which an alicyclic diisocyanate was used as the diisocyanate.

In contrast, in Comparative Example 1, in which only a diethyltoluenediamine containing no alkylthio group was used as the aromatic diamine, gelation occurred within 3 minutes after mixing and thus the viscosity was unable to be measured. Furthermore, no uniform curing was achieved and separation occurred. In Comparative Example 3, in the same manner as in Comparative Example 1, gelation occurred early and no uniform cured product was obtained.

In Comparative Example 2, in which only a 4,4'-methylenebis(N-sec-butylaniline) containing no alkylthio group was used as the aromatic diamine, the mixed viscosity was low, and although curing was achieved without the occurrence of separation, stickiness occurred after curing. Furthermore, a melt occurred during measurement of the glass transition temperature and thus the glass transition temperature was unable to be measured.

In Comparative Example 4, in which only a diol was used as the active hydrogen component, the mixed viscosity was low and the curability was excellent, but the glass transition temperature was low and the tensile fracture strain was small. In Comparative Example 5, dimethylthiotoluenediamine was used as the aromatic diamine, but because MDI was used as the diisocyanate component, gelation occurred within 3 minutes after mixing and thus the viscosity was unable to be measured. Furthermore, no uniform curing was achieved and separation occurred.

Each of the composition of Examples 1, 8, and 13 and 16 to 18 was used as a matrix resin to produce a fiber-reinforced composite material. Carbon fiber ("Teijin Carbon Cloth W-3161", manufactured by Teijin Ltd.) was used as the reinforcing fiber. After being cleaned with acetone, the carbon fiber was dried and thereafter used to produce a fiber-reinforced composite material through a hand lay-up method. Specifically, while being impregnated with the above-described mixture (specifically, a first liquid with a second liquid added thereto being stirred and mixed for 1 minute), 8 sheets of the carbon fiber were layered and thereafter heat-pressed (adjusted to a thickness of 2 mm using a spacer) at 120° C. for 6 hours to thereby produce a fiber-reinforced composite material having a thickness of about 2 mm.

A bending test was conducted on each obtained fiber-reinforced composite material to measure the bending stress. In the bending test, in accordance with JIS K7074, a precision universal tester manufactured by Shimadzu Corporation was used as a measuring apparatus, and under the conditions of a test speed: 5.333 mm/min and an inter-fulcrum distance: 80 mm, the maximum stress obtained was determined to be the bending stress. The results are presented in Table 4 below.

TABLE 4

| Two-liquid curable composition | Example 1 | Example 8 | Example 13 | Example 16 | Example 17 | Example 18 |
|---|---|---|---|---|---|---|
| Bending stress (MPa) | 240 | 295 | 341 | 633 | 712 | 715 |

As presented in Table 4, the fiber-reinforced composite materials produced with the use of the two-liquid curable compositions of Examples exhibited high bending stress and were imparted with high mechanical strength. Thus, it is evident that the two-liquid curable compositions of Examples are usable as matrix resins for fiber-reinforced composite materials.

While some embodiments of the present invention have been described above, these embodiments are presented as examples and are not intended to limit the scope of the invention. These embodiments can be implemented in various other forms, and various omissions, replacements, and modifications can be made within the scope that does not depart from the essence of the invention. These embodiments and those to which omissions, replacements, and modifications are made fall within the scope of the invention described in the claims and its equivalents as well as within the scope and spirit of the invention.

The invention claimed is:

1. A fiber-reinforced composite material, comprising:
a cured product of a two-liquid curable composition,
wherein the cured product comprises:
the two-liquid curable composition, and
a reinforcing fiber;
wherein the two-liquid curable composition comprises:
an active hydrogen component comprising an alkylthio group-containing aromatic diamine; and
a diisocyanate component comprising at least one diisocyanate selected from the group consisting of an aliphatic diisocyanate, an alicyclic diisocyanate, a modified aliphatic diisocyanate, and a modified alicyclic diisocyanate;
wherein an isocyanate group content of the diisocyanate compound is from 15% to 50% by mass,
a content of the at least one diisocyanate is at least 80% by mass based on a total content of the diisocyanate component; and
a content of the alkylthio group-containing aromatic diamine is a least 40% by mass based on a total content of the active hydrogen component.

2. The fiber-reinforced composite material of claim 1, wherein the active hydrogen component further comprises a diol.

3. The fiber-reinforced composite material of claim 1, wherein the content of the at least one diisocyanate is at least 90% by mass based on a total content of the diisocyanate component.

4. The fiber-reinforced composite material of claim 1, wherein the content of the at least one diisocyanate is at least 95% by mass based on a total content of the diisocyanate component.

5. The fiber-reinforced composite material of claim 1, wherein the content of the alkylthio group-containing aromatic diamine is at least 70% by mass based on a total of the active hydrogen component.

* * * * *